(12) United States Patent
Phillips et al.

(10) Patent No.: US 11,333,099 B2
(45) Date of Patent: May 17, 2022

(54) EARLY DIRECT FUEL INJECTION FOR INTERNAL COMBUSTION ENGINES

(71) Applicant: Tula Technology, Inc., San Jose, CA (US)

(72) Inventors: Andrew W. Phillips, Rochester, MI (US); Jerry F. Fuschetto, Bay Point, CA (US)

(73) Assignee: Tula Technology, Inc., San Jose, CA (US)

(*) Notice: Subject to any disclaimer, the term of this patent is extended or adjusted under 35 U.S.C. 154(b) by 0 days.

(21) Appl. No.: 17/218,657

(22) Filed: Mar. 31, 2021

(65) Prior Publication Data

US 2021/0404412 A1 Dec. 30, 2021

Related U.S. Application Data

(60) Provisional application No. 63/044,572, filed on Jun. 26, 2020.

(51) Int. Cl.
*F02D 41/00* (2006.01)
*F02D 41/40* (2006.01)
*F02D 13/02* (2006.01)
*F02D 41/38* (2006.01)

(52) U.S. Cl.
CPC ....... *F02D 41/402* (2013.01); *F02D 13/0242* (2013.01); *F02D 41/009* (2013.01); *F02D 41/401* (2013.01); *F02D 2041/389* (2013.01)

(58) Field of Classification Search
CPC .......... F02D 1/16; F02D 41/061; F02D 41/34; F02D 41/345; F02D 41/365; F02D 2200/0618; F02D 2700/10; F02D 37/02; F02P 5/00; F02P 5/04; F02P 5/045

USPC ........ 701/104, 105; 123/672, 406.11, 406.47
See application file for complete search history.

(56) References Cited

U.S. PATENT DOCUMENTS

| 5,337,720 | A | 8/1994 | Murakami et al. |
| 7,577,511 | B1 | 8/2009 | Tripathi et al. |
| 7,581,531 | B2 | 9/2009 | Schulz |
| 7,849,835 | B2 | 12/2010 | Tripathi et al. |
| 7,886,715 | B2 | 2/2011 | Tripathi et al. |
| 7,934,474 | B2 | 6/2011 | Tripathi et al. |
| 8,099,224 | B2 | 1/2012 | Tripathi et al. |

(Continued)

FOREIGN PATENT DOCUMENTS

| JP | 2002180881 | 6/2002 |
| KR | 101865913 | 6/2018 |

(Continued)

OTHER PUBLICATIONS

International Search Report and Written Opinion dated Jul. 16, 2021 from International Application No. PCT/US2021/025369.

(Continued)

*Primary Examiner* — John Kwon
(74) *Attorney, Agent, or Firm* — Beyer Law Group LLP

(57) ABSTRACT

A skip fire engine controller is disclosed that commands an early direct-injection of fuel during a skipped working cycle in which a cylinder is not exhausted. With early direct injection, the fuel has more time to vaporize and mix with air for combustion in an immediately following working cycle in which the cylinder is fired. By increasing the degree of vaporization and mixing, the combustion is both cleaner and more efficient.

24 Claims, 6 Drawing Sheets

(56) References Cited

U.S. PATENT DOCUMENTS

| | | | |
|---|---|---|---|
| 8,131,445 | B2 | 3/2012 | Tripathi et al. |
| 8,131,447 | B2 | 3/2012 | Tripathi et al. |
| 8,464,690 | B2 | 6/2013 | Yuille et al. |
| 8,616,181 | B2 | 12/2013 | Sahandiefanjani et al. |
| 8,651,091 | B2 | 2/2014 | Tripathi et al. |
| 8,839,766 | B2 | 9/2014 | Serrano |
| 8,869,773 | B2 | 10/2014 | Tripathi et al. |
| 9,020,735 | B2 | 4/2015 | Tripathi et al. |
| 9,086,020 | B2 | 7/2015 | Tripathi et al. |
| 9,291,106 | B2 | 3/2016 | Switkes et al. |
| 9,399,964 | B2 | 7/2016 | Younkins et al. |
| 10,323,588 | B2 | 6/2019 | VanDerWege |
| 10,982,617 | B2 | 4/2021 | Luo et al. |
| 2017/0030278 | A1* | 2/2017 | Phillips ............... F02D 41/0087 |
| 2017/0370310 | A1* | 12/2017 | Kotwicki ............ F02D 41/0087 |
| 2020/0072152 | A1* | 3/2020 | Luo .................... F02D 41/3094 |

FOREIGN PATENT DOCUMENTS

| | | |
|---|---|---|
| WO | WO 2010/006311 | 1/2010 |
| WO | WO 2011/085383 | 7/2011 |

OTHER PUBLICATIONS

Partial English translation of Korean Publication No. 10-1865913, which was previously in the Office Action dated Dec. 21, 2021.

\* cited by examiner

EARLY DIRECT FUEL INJECTION FOR INTERNAL COMBUSTION ENGINES

CROSS-REFERENCE TO RELATED APPLICATIONS

This application claims priority of U.S. Provisional Application No. 63/044,572, filed on Jun. 26, 2020, which is incorporated by reference herein for all purposes.

FIELD OF THE INVENTION

The present invention relates generally to skip fire operation of an internal combustion engine, and more particularly, to an engine controller arranged to command a pulse of fuel to be early direct-injected into a cylinder during a working cycle in which the cylinder is skipped and not exhausted for combustion and firing in an immediate next working cycle. With early fueling, the degree of fuel vaporization and mixing with air during induction is improved, thereby resulting in more efficient and cleaner combustion.

BACKGROUND

Most vehicles in operation today are powered by internal combustion engines. Internal combustion engines have one or more cylinders where combustion occurs. Under normal driving conditions, the torque generated by the internal combustion engine needs to vary over a wide operating range in order to meet the demands of the driver and driving conditions.

Skip fire is an engine control method that allows for an internal combustion engine to operate at one or more effective reduced displacements that are less than full displacement of the engine. With skip fire engine control, one of multiple fixed firing fractions, each indicative of a reduced effective displacement, is selected as needed to meet a requested torque demand. As the torque demand changes during driving, the engine transitions from one fixed firing fraction to a target firing fraction suitable for the requested torque. By varying the effective displacement of the engine as needed during driving, significant fuel saving can be realized.

Most modern internal combustion engines used by vehicles, such as automobiles and trucks, rely on fuel injection for delivery of fuel to the cylinders. One type of known fuel delivery system is often referred to as "direct-injection". With direct-injection, fuel is injected directly into the cylinder. In general, direct-injection offers increased fuel efficiency and higher power output because the amount and timing of the delivery of the fuel into the cylinder can be more precisely controlled compared to indirect-injection.

The timing of direct-injection of pulses of fuel, however, is self-limiting. When a cylinder is fired, combusted gases are exhausted during the exhaust stroke of the working cycle. If fuel for the next working cycle was direct-injected prior to completion of the previous working cycle, it would be expelled along with the combusted gases. Consequently, the direct-injection of fuel can occur only with the start of a next working cycle after the previous working cycle is complete. The amount of time the fuel has to vaporize and mix with air within the chamber ahead of the compression and combustion strokes of the next working cycle is therefore limited. With less time for the fuel to vaporize and mix, combustion is less clean and fuel efficient.

A way to extend the time for fuel vaporization and mixing ahead of at least some fired working cycles of a skip fire controlled internal combustion engine is therefore needed.

SUMMARY

The present application is directed toward an engine controller arranged to command a pulse of fuel to be direct-injected into a cylinder during a previous working cycle in which the cylinder is skipped and not exhausted. With the early injection of the fuel, there is more time for the fuel to vaporize and mix with air ahead of and during the immediate next working cycle in which the cylinder is fired. As a result, the combustion of the fuel during the next working cycle is both cleaner and more efficient.

In a non-exclusive embodiment, the engine controller is arranged to control the internal combustion engine by (a) commanding a cylinder to be fired in a working cycle, (b) ascertain if the cylinder is to be exhausted or not during an exhaust stroke of the previous working cycle with respect to the working cycle, and (c) if not exhausted, command a pulse of fuel to be direct-injected into the cylinder during the previous working cycle for combustion in the next working cycle.

In another non-exclusive embodiment, a system for controlling an internal combustion engine is disclosed. The system includes a skip fire engine controller arranged to (a) command the firing of some working cycles of the cylinders of the internal combustion engine to be fired while commanding other working cycles of the cylinders to be skipped and not fired, (b) for a select cylinder commanded to be fired during a given working cycle, ascertaining if the select cylinder in an immediately preceding working cycle was skipped and not exhausted, and (c) command a fuel injection controller to early inject fuel into the select cylinder during the immediately preceding skipped and not exhausted working cycle for combustion in the given working cycle.

BRIEF DESCRIPTION OF THE DRAWINGS

The invention and the advantages thereof, may best be understood by reference to the following description taken in conjunction with the accompanying drawings in which.

In the drawings, like reference numerals are sometimes used to designate like structural elements. It should also be appreciated that the depictions in the figures are diagrammatic and not to scale.

DETAILED DESCRIPTION

Figure 1:
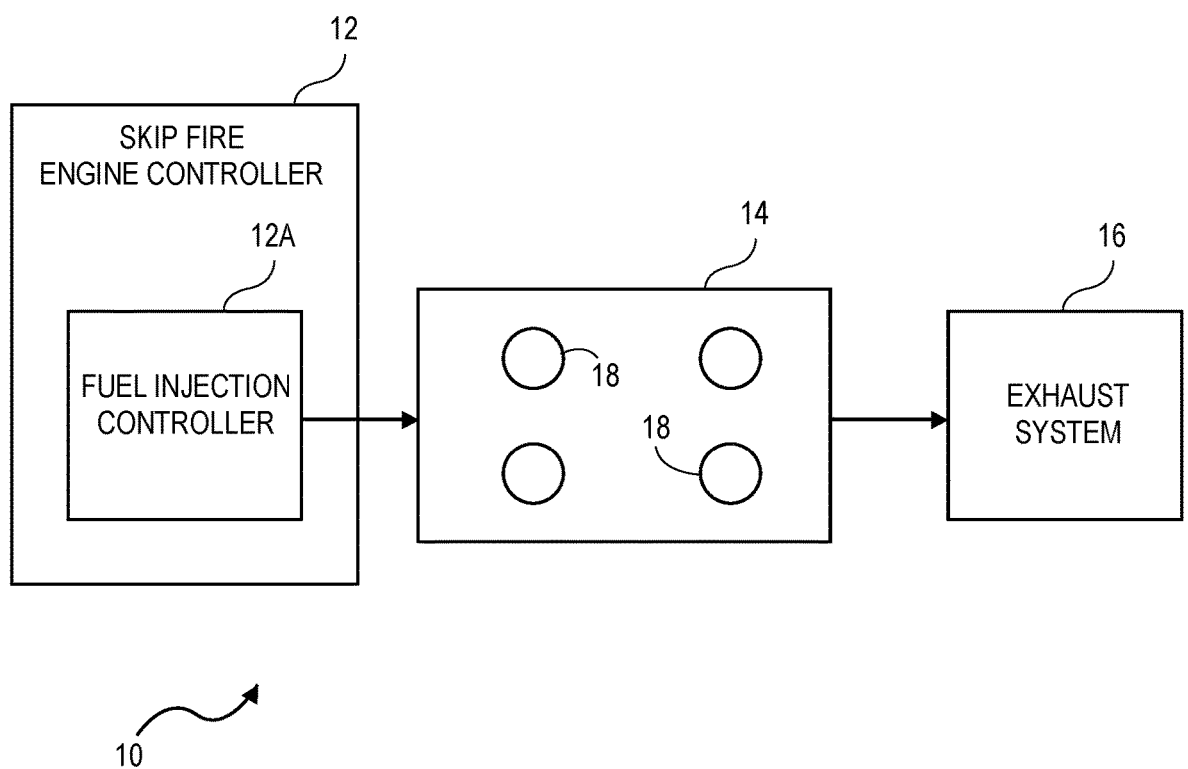
FIG. 1 is a logic diagram of an engine controller, internal combustion engine, and exhaust system of an exemplary vehicle in accordance with a non-exclusive embodiment of the present invention.

The present application is directed toward a skip fire engine controller that commands the early direct-injection of fuel during a skipped working cycle in which a cylinder is not exhausted. With early injection, the fuel has more time to vaporize and mix with air for combustion in an immediately following working cycle in which the cylinder is fired. By increasing the degree of vaporization and mixing, the combustion is both cleaner and more efficient.

Skip Fire Engine Control

Skip fire engine control contemplates selectively skipping the firing of certain cylinders during selected firing opportunities. As a result, for a given effective reduced displacement, a particular cylinder may be fired, skipped and then either fired or skipped over consecutive working cycles. From an engine cycle perspective, sequential engine cycles may have different cylinders fired and skipped while the engine is operating at the same firing fraction or firing density. In contrast, with conventional variable displacement engine control, one group of cylinders is continually fired, while another group of cylinders is continually deactivated, for a given reduced effective displacement.

Skip fire facilitates significantly finer control of the effective displacements of an engine than is possible using a conventional variable displacement approach. With skip fire for example, firing every third cylinder in a 4-cylinder engine would provide an effective displacement of $\frac{1}{3}^{rd}$ of the full engine displacement. In the same 4-cylinder engine, the same $\frac{1}{3}^{rd}$ effective displacement is not obtainable by simply deactivating a group of one or more cylinders.

Conceptually, virtually any effective displacement can be obtained using skip fire control, although in most practical implementations operation is limited to a fixed set of available firing densities, fractions, sequences, or patterns. In certain implementations of skip fire, often referred to as Dynamic Skip Fire or DSF, firing decisions regarding whether to skip or fire a particular cylinder during a particular driving cycle are dynamically made. In other words, the decision is often made either on an individual cylinder firing opportunity-by-firing opportunity basis or on an engine cycle-by-engine cycle basis.

With DSF implementations relying on a defined set of firing patterns or firing densities, each has a corresponding effective engine displacement. The particular set of firing patterns/densities that may be used for a given internal combustion engine may widely vary, from limited (e.g. a hand full of fractions e.g., ¼, ⅓, ½, ⅔ and 1) to those that use significantly more. By way of example of the latter, some skip fire controllers designed by the Applicant facilitate operation at any firing density having a firing fraction between zero (0) and one (1) having an integer denominator of nine (9) or less. Such a controller has a set of 29 potential firing fractions, specifically: 0, ⅑, ⅛, ⅐, ⅙, ⅕, 2/9, ¼, 2/7, ⅓, ⅜, ⅖, 3/7, 4/9, ½, 5/9, 4/7, ⅗, ⅝, ⅔, 5/7, ¾, 7/9, ⅘, ⅚, 6/7, ⅞, 8/9, and 1.

Although 29 potential firing fractions may be possible, not all firing fractions are suitable for use in all circumstances. Rather, at any given time, there may be a much more limited subset of firing fractions that are capable of delivering the desired engine torque while satisfying suitable drivability and noise, vibration and harshness (NVH) constraints.

The Applicant has filed a number of patents describing various approaches to skip fire control. By way of example, U.S. Pat. Nos. 7,849,835; 7,886,715; 7,934,474; 8,099,224; 8,131,445; 8,131,447; 8,464,690; 8,616,181; 8,651,091; 8,839,766; 8,869,773; 9,020,735; 9,086,020; 9,120,478; 9,175,613; 9,200,575; 9,200,587; 9,291,106; 9,399,964 and others, describe a variety of engine controllers that make it practical to operate a wide variety of internal combustion engines in a skip fire operational mode. Each of these patents is incorporated herein by reference for all purposes.

Dynamic Multi-Level Skip Fire

Dynamic multi-level skip fire is a variation of DSF. With dynamic multi-level DSF, not only is a decision made to either skip or fire individual cylinders on a firing opportunity-by-firing opportunity or engine-cycle basis, but also one of several possible output levels is also selected for each fired cylinder. By selectively using different air charges and/or fueling levels, the work output of individual cylinders can be controlled or modulated to have different output levels. Dynamic multi-charge level engine operation where individual working cycles are operated at different cylinder output levels may be applied to various types of engine control besides DSF, including engines where all cylinders are always fired or engines where banks of cylinders can be deactivated. By way of example, U.S. Pat. No. 9,399,964 describes various implementations of dynamic multi-level skip fire engine operation and is incorporated by reference herein for all purposes.

Dynamic skip fire and dynamic multi-charge level engine operation may collectively be considered different types of dynamic firing level modulation engine operation in which the output of each working cycle (e.g., skip/fire, high/low, skip/high/low, etc.) is dynamically determined during operation of the engine, typically on an individual cylinder firing opportunity-by-firing opportunity basis or on an engine cycle-by-engine cycle basis.

Exemplary Embodiments

Referring to FIG. 1, a logic diagram 10 of a skip fire engine controller 12, including a fuel injection controller 12A, internal combustion engine 14 and exhaust system 16 of an exemplary vehicle is shown. The internal combustion engine 14 includes a plurality of cylinders 18.

The skip fire engine controller 12 is arranged to operate the internal combustion engine 14 in a skip fire manner as described above. For instance, in one embodiment, the skip fire engine controller 12 may operate the internal combustion engine 14 at one of multiple firing fractions to meet a specific torque demand. As the torque demand changes during driving, the skip fire engine controller changes the firing fraction accordingly.

With each firing fraction that is less than one, the internal combustion engine 14 operates at an effective reduced displacement that is less than full displacement of the engine. For a given firing fraction that is less than one, at least one cylinder 18 is fired, skipped and selectively either fired or skipped over successive firing opportunities.

In another embodiment, the skip fire engine controller 12 may be a DSF engine controller wherein a decision to fire or skip each cylinder 18 is made on either a firing opportunity-by-firing opportunity basis or on an engine cycle-by-engine cycle basis. In yet another embodiment, the skip fire engine controller 12 may be a dynamic, multi-level, skip fire internal combustion engine wherein the output of fired cylinder(s) 18 is selected from one of several different possible output levels.

In the embodiment illustrated, the internal combustion engine 14 includes 4 cylinders 18. It should be understood that this number may widely vary. In other embodiments, the number of cylinders 18 may range from, for example, 1, 2, 3, 5, 6, 8, 12, 16 or more. The cylinders 18 may be arranged in banks or may be in an in-line configuration.

The internal combustion engine 14 may also be either spark-ignition (SI) or compression ignition. With the former, a spark generated by a spark plug is used to ignite the air-fuel mixture for combustion. With the latter, ignition is caused by a combination of pressure and elevated temperature. In yet other embodiments, the internal combustion engine can be a Homogeneous Charge Compression Ignition engine (HCCI). The internal combustion engine 14 may also be configured to operate using one or multiple different fuels, such as gasoline, Diesel, ethanol, compressed natural gas, liquefied petroleum or just about any other type of fuel suitable for an internal combustion engine.

The exhaust system 16 is provided to limit emissions of undesirable pollutants, including PM/PN emission, that are a byproduct of combustion. The components in the exhaust 16 may vary depending on the type of internal combustion engine. With spark ignition gasoline engines, the exhaust system 16 typically includes a 3-way catalyst that both oxidizes unburned hydrocarbons and carbon monoxide and reduces nitrous oxides ($NO_x$). These catalysts require that on average the engine combustion be at or near a stoichiometric air/fuel ratio, so that both oxidation and reduction reactions can occur. Compression ignition engines generally run lean. Consequently, compression ignition engines, such as Diesel engines, cannot rely on a conventional 3-way catalyst to meet emissions regulations. Instead, they use other types of aftertreatment devices to reduce $NO_x$ emissions. These aftertreatment devices may use a combination of lean $NO_x$ traps and selective catalyst reduction (SCR) to reduce nitrous oxides to molecular nitrogen. Additionally, compression ignition engines may also use or require a particulate filter to reduce soot emissions. In various embodiments, the exhaust system 16 may include any combination of one or more of the above-listed aftertreatment elements.

The cylinders 18, regardless of the number, are configured to generate a torque output during active ("fired") work cycles. In various embodiments, the internal combustion engine 14 may be any numbered stroke engine, for example, either a 4-stroke or a 2-stroke engine.

The fuel injection controller 12A is arranged to operate in cooperation with the skip fire engine controller 12. As described in more detail below, the fuel injection controller 12A is arranged to command a direct-injection fuel element associated with each cylinder 18 to either inject or not inject one or more pulses of fuel into the working chamber. It is also noted that the fuel injection controller 12A may be implemented in a number of different ways, such as a microprocessor or microcontroller, software, firmware, hardware, programmable logic, dedicated circuitry, or a combination thereof. The fuel injection controller 12A may also be separate from or embedded in or otherwise operate as a sub-function of the skip fire engine controller 12.

Direct-Injection

Figure 2:
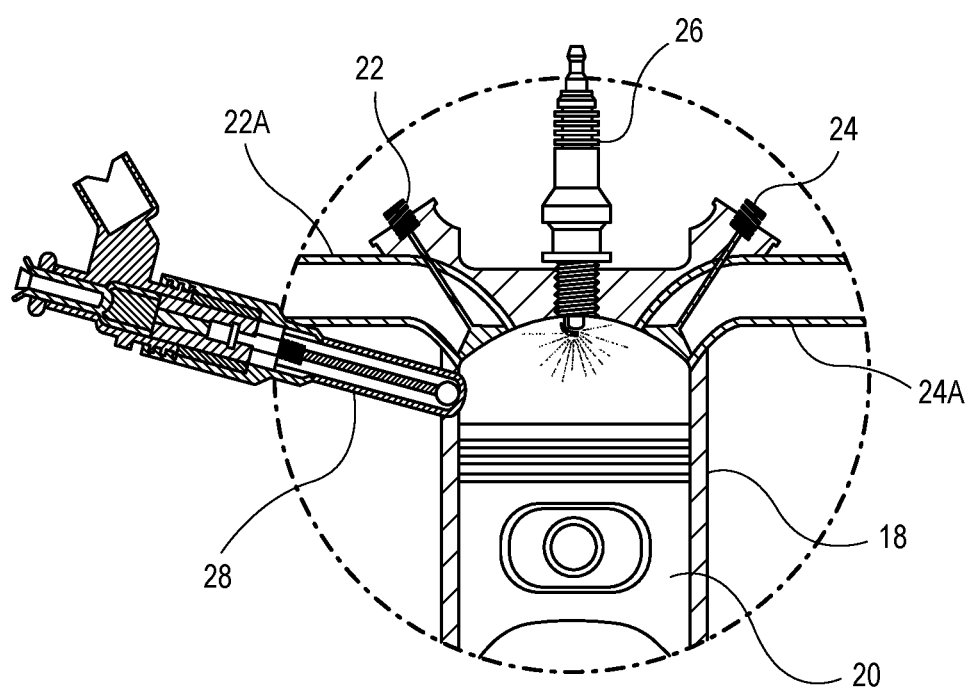
FIG. 2 illustrates an exemplary cylinder of an internal combustion engine that uses direct-injection in accordance with the present invention.

Referring to FIG. 2, a cross section of an exemplary cylinder 18 with direct-injection is illustrated. The cylinder 18 includes a reciprocating piston 20, an intake valve 22, air intake runner 22A, an exhaust valve 24, an exhaust runner 24A, a spark plug 26 and a direct fuel injection element 28.

During a working cycle, the piston 20 reciprocates between positions that are commonly referred to as Top Dead Center (TDC) and Bottom Dead Center (BDC).

The air intake runner 22A supplies air to the cylinder 18 when the intake valve 22 is opened.

The exhaust valve 24, when opened, allows combustion gases and other byproducts of combustion such as particulate matter to be exhausted from the cylinder 18 through the exhaust runner 24A to the exhaust system 16.

The spark plug 26 generates a spark that ignites the air-fuel mixture in the cylinder 18.

The direct fuel injection element 28 is arranged to inject fuel directly into the cylinder 18. As described in more detail below, the direct-injection element 28 is capable of injecting a single relatively large pulse of fuel, or alternatively, two or more smaller pulses during one or more strokes of any given working cycle.

In the example shown, the cylinder 18 is spark ignited. If the cylinder 18 relied on compression ignition, it would essentially be the same as illustrated, but without the spark plug 26.

For the sake of simplicity, the exemplary cylinder 18 is depicted with only one intake valve 22 and one exhaust valve 24. It should be understood that with many internal combustion engines, the cylinders 18 may have two or more intake valves 22 and/or exhaust valves 24.

Split Injection

Split injection is a variation of direct-injection. With split injection, two, or potentially more, pulses of fuel are directly-injected by the direct fuel injection element 28 into a cylinder 18 during a given working cycle. Split injection is typically employed to reduce emissions during a cold start and to mitigate knock at high loads.

Although direct-injection, including split injection, as described below can be used with any internal combustion engine regardless of the number of strokes, the following explanation is described in the context of a 4-stroke engine.

Working Cycle for a 4-Stroke Engine

Figure 3:
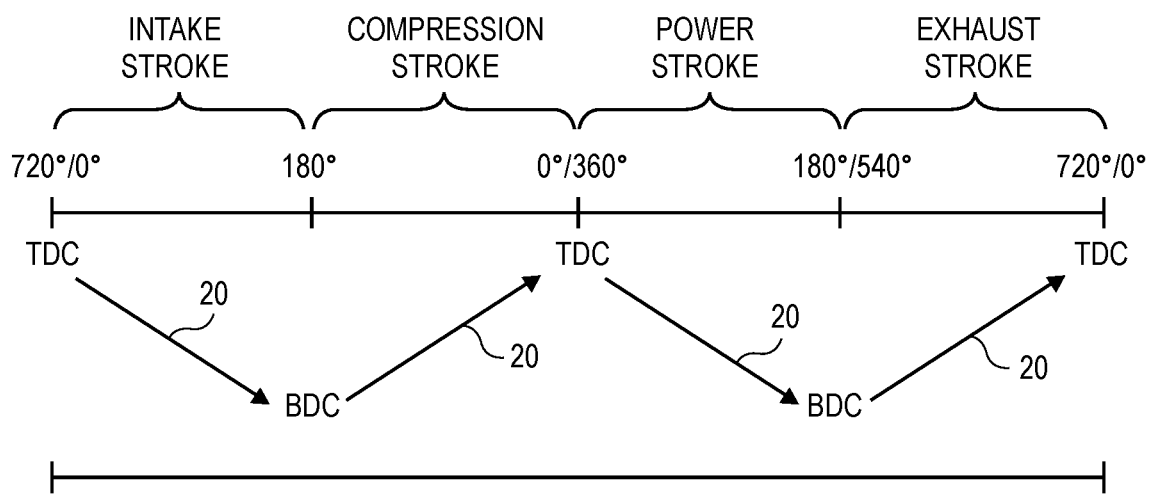
FIG. 3 illustrates a working cycle of a cylinder.

Referring to FIG. 3, a typical working cycle of a cylinder 18 of a 4-stroke internal combustion engine 14 shown. The 4 strokes include an intake stroke, a compression stroke, a power stroke and an exhaust stroke. All four strokes are completed in two revolutions of a crankshaft of the internal combustion engine 14, or a total of 720 degrees of angular rotation.

During a conventional working cycle, a given cylinder 18 operates as follows:

Intake Stroke: The intake valve(s) 22 is/are opened and the piston 20 moves from TDC to BDC, resulting in air being inducted into the chamber from the air intake runner 22. The fuel injection element 28 typically injects one or more pulses of fuel after the intake valve(s) is opened;

Compression Stroke: The intake valve(s) 22 is/are closed, and the piston 20 moves from BDC to TDC. With some working cycles, the fuel injection element 28 may inject one or more additional pulses of fuel. As the piston moves from BDC to TDC, the air-fuel mixture is compressed in the cylinder. With spark-ignition (SI) engines the spark plug 26 generates a spark near the end of the compression stroke, causing the compressed air-fuel mixture to combust. With compression engines, pressure and elevated temperatures within the cylinder result in ignition near the end of the compression stroke;

Power Stroke: The piston 20 moves from TDC to BDC as the combustion front propagates throughout the enclosed cylinder volume, generating a large increase in temperature and pressure of the trapped gas. As the piston 20 moves, the cylinder 20 generates a torque output or work; and Exhaust Stroke: In the exhaust stroke, valve(s) 24 is/are opened and the piston moves from BDC to TDC, forcing out the by-products of combustion, including gases, particulates, and other pollutants, through the exhaust runner 24A and into the exhaust system 16.

Once a given work cycle is complete, the piston 20 is again at the TDC position and the cylinder is ready to begin its next working cycle.

The above-described conventional working cycle is self-limiting at least in regards to the delivery of fuel for the next working cycle. Since exhaust valve(s) 24 are opened and combusted gases are expelled during the exhaust stroke of a current working cycle, the soonest fuel can be delivered to the cylinder 18 for the next working cycle is after the current working cycle is complete. As a result, the amount of time the fuel has to vaporize, atomize, and mix with air during the next working cycle is limited.

With skip fire controlled internal combustion engines, however, there is a possible opportunity of early direct-injection of fuel prior to the start of a next working cycle if the cylinder was skipped during the current working cycle. With skipped working cycles, the cylinder 18 is typically commanded to operate as one of several types of pneumatic springs, including a Low Pressure Exhaust Spring (LPES), a High Pressure Exhaust Spring (HPES) and an Air Spring (AS).

Pneumatic Cylinder Spring Types

As previously described, individual cylinders 18 of the internal combustion engine 14 may be selectively fired or skipped during any given working cycle. Typically, with skipped working cycles, the cylinder 18 is not fired or skipped, meaning no fuel is provided and the intake valve(s) 22, the exhaust valve(s) 24, or both, are deactivated to prevent air pumping. However, by manipulating the timing of the opening and/or closing of the intake and exhaust valves 22, 24, gases and potentially fuel, can be intentionally trapped within the cylinder 18, resulting in one of the above-identified pneumatic springs.

A LPES is realized by opening the exhaust valve(s) 24 during the exhaust stroke in a prior fired working cycle and by deactivating the intake valve(s) 22 during the induction stroke of a skipped working cycle that follows the fired working cycle. As a result, no air is inducted into the cylinder 18 and low pressure exhaust gas is trapped in the chamber. During the subsequent compression stroke as the piston 20 moves from BDC to TDC, the pressure inside the chamber is relatively low because only residual combusted gas from the previous fired working cycle remains. No fuel is typically injected into the chamber as well, so there is no combustion during the combustion stroke, regardless if a spark occurs or not. Finally, in the exhaust stroke, the exhaust valve 24 is deactivated and remains closed. Any residual combusted gas remains within the chamber and is not exhausted.

A HPES is realizes by commanding the induction, compression and expansion strokes to occur as normal as described above. In the exhaust stroke of the fired working cycle, however, the exhaust valve(s) 24 is/are not opened. As a result, high pressure combusted exhaust gas remains trapped within the cylinder 18 and is not exhausted. In the subsequent skipped working cycle, the intake valve(s) 22 is/are deactivated and remain closed so that no new air is inducted. Instead, the trapped exhaust gas is expanded in the intake stroke and then compressed in the compression stroke. Since there is no fresh air in the cylinder, and no fuel is typically injected, there is no combustion in the compression or expansion strokes. Instead, the trapped exhaust gas is again expanded in the expansion stroke and compressed in the exhaust stroke by maintaining the exhaust valve(s) 24 deactivated and closed.

An air spring (AS) is realized by opening the intake valve(s) 22 during the induction stroke of a first AS skipped working cycle so air is inducted into the cylinder 18. In the compression stroke, the inducted air is compressed, but no fuel is injected or present, so there is no combustion. The air is then expanded in the expansion stroke. In the exhaust stroke, the exhaust valve(s) 24 is/are deactivated and maintained closed so that the air is not exhausted.

Re-Breathing and Re-Exhausting

When a cylinder 18 is operated as either an AS or LPES over a successive number of working cycles, it may be advantageous to either re-breath or re-exhaust the cylinder from time to time.

For example with AS type pneumatic springs, the air charge within the cylinder 18 may leak out over successive working cycles. There are several ways to replenish the air charge. In one way, the intake valve(s) 22 is/are opened during an intake stroke, inducting air into the cylinder 18. In an alternative approach, the exhaust valve(s) 24 are typically opened at the end of one working cycle and then the intake valve(s) 22 are opened during the next working cycle, allowing air to be inducted into the chamber. Regardless of the approach used, the process of replenishing the air charge is often referred to as "re-breathing".

With LPES type pneumatic springs, the pressure within the cylinder may gradually increase over repeated skips due to leakage. To reduce the pressure, the exhaust valve(s) 24 may be opened during a skipped working cycle, thereby exhausting air or other gases that may have entered or leaked into the chamber. This process is sometime referred to as "re-exhausting". Thus, with LPES type pneumatic springs, the exhaust valve(s) 24 of a cylinder is/are typically maintained closed most of the time. If the cylinder 18 is re-exhausted, however, the exhaust valve(s) 24 is/are opened.

Skip Fire and Early Fuel Injection Strategy

With skip fire engine control, a relatively high percentage of firing opportunities can possibly be skipped. Since the exhaust valve(s) 24 remain closed most of the time during skipped working cycles, there is little possibility that fuel directly-injected into the cylinder during a skipped working cycle will be expelled. The Applicant, therefore, proposes early fueling of reactivated cylinders 18, immediately following skips, by fueling the cylinder 18 at least partially during the power and/or exhaust strokes of a prior skipped working cycle.

Although early fueling may be used for all three of the above-described pneumatic springs, the Applicant has found that LPES and AS types pneumatic springs are generally preferred. In both cases, the combusted gases, particulates and other byproducts of combustion are present at minimal levels within the cylinder 18 because they were previously exhausted. As a result, only residual gas in the case of LPES and air in the case of AS is present in the cylinder 18 at the start of the next working cycle. On the other hand with HPES, combusted gases, particulates and other combustion byproducts remain in the cylinder 18. As a result early fueling with skipped HPES type springs is typically less desirable. Early direct injection, therefore, should not be construed as limited to just LPES and AS, but may be used with all three types of pneumatic springs.

Early Direct Fuel Injection

As previously noted, the skip fire engine controller 12 is arranged to control the internal combustion engine 14 to operate in a skip fire manner. As a result, some firing opportunities of the cylinder 14 are fired while other firing opportunities of the cylinders are skipped. While operating at a particular firing fraction that is less than one (e.g., fractions such as ⅓, ⅔, etc.), each of the fired cylinders 18 generate substantially the same torque output. On the other hand with modulated versions of skip fire, the output of fired cylinders 18 may be modulated to have different outputs (e.g., high, medium or low) while the internal combustion engine 14 is operating at a given effective reduced displacement.

When a cylinder 18 is skipped, either an LPES or AS type pneumatic spring is typically commanded, although an HPES type pneumatic spring can be commanded as well. Regardless of the type of pneumatic spring used for a skip, the skip fire engine controller 12 commands the direct-injection element 28 not to fuel the cylinder 18 and commands the intake valve(s) 22 and/or exhaust valve(s) 24 to open and close as required for implementing either the LPES or AS type spring, including deactivating or maintaining the exhaust valve(s) 24 closed during the exhaust stroke as discussed above.

During operation of the internal combustion engine 14, there often are many occurrences when a cylinder 18 is reactivated in one working cycled immediately following a skip in the preceding working cycle. When this situation occurs, the skip fire engine controller 12, in cooperation with the fuel injection controller 12A, may implement early fuel injection. The control algorithm implemented by the skip fire engine controller 12 for making a decision for the early fueling or not for each firing opportunity involves:

(a) Commanding a cylinder 18 next in sequenced order to be either fired or skipped in an upcoming working cycle. The fire or skip decision is typically dictated per the current firing fraction the internal combustion engine 14 is operating and the sequenced order of the cylinder 18 in the engine cycle. If the cylinder 18 is to be skipped, then skip fire controller commands one of the pneumatic springs be implemented in the next working cycle;

(b) On the other hand if the cylinder 18 is to be fired, then the skip fire controller 12 ascertains if the cylinder 18 in question is to be exhausted or not during the previous working cycle that immediately precedes the upcoming working cycle. Determining if the cylinder 18 was exhausted or not is typically a two step decision process. In the first step, the skip fire engine controller 12 determines if the cylinder was fired or skipped in the previous working cycle. If the cylinder was skipped in previous working cycle, then the skip fire engine controller 12 determines if the exhaust valve(s) 24 is/are to remain closed or are to be opened for a re-breathing or re-exhausting event; and (c) If not exhausted, then the skip fire engine controller 12, in cooperation with the fuel injection controller 12A, commands one or more pulses of fuel be directly-injected into the cylinder 18 during the previous working cycle for combustion during the immediately following or upcoming working cycle.

On the other hand if the cylinder 18 is exhausted during the previous working cycle, either because it was fired or for some other purpose, such re-breathing or re-exhausting, then a decision is made for no early direct-injection of fuel. Instead, the fuel is commanded for injection only during the intake and/or compression strokes of the next working cycle when the cylinder is fired.

Figure 4A:
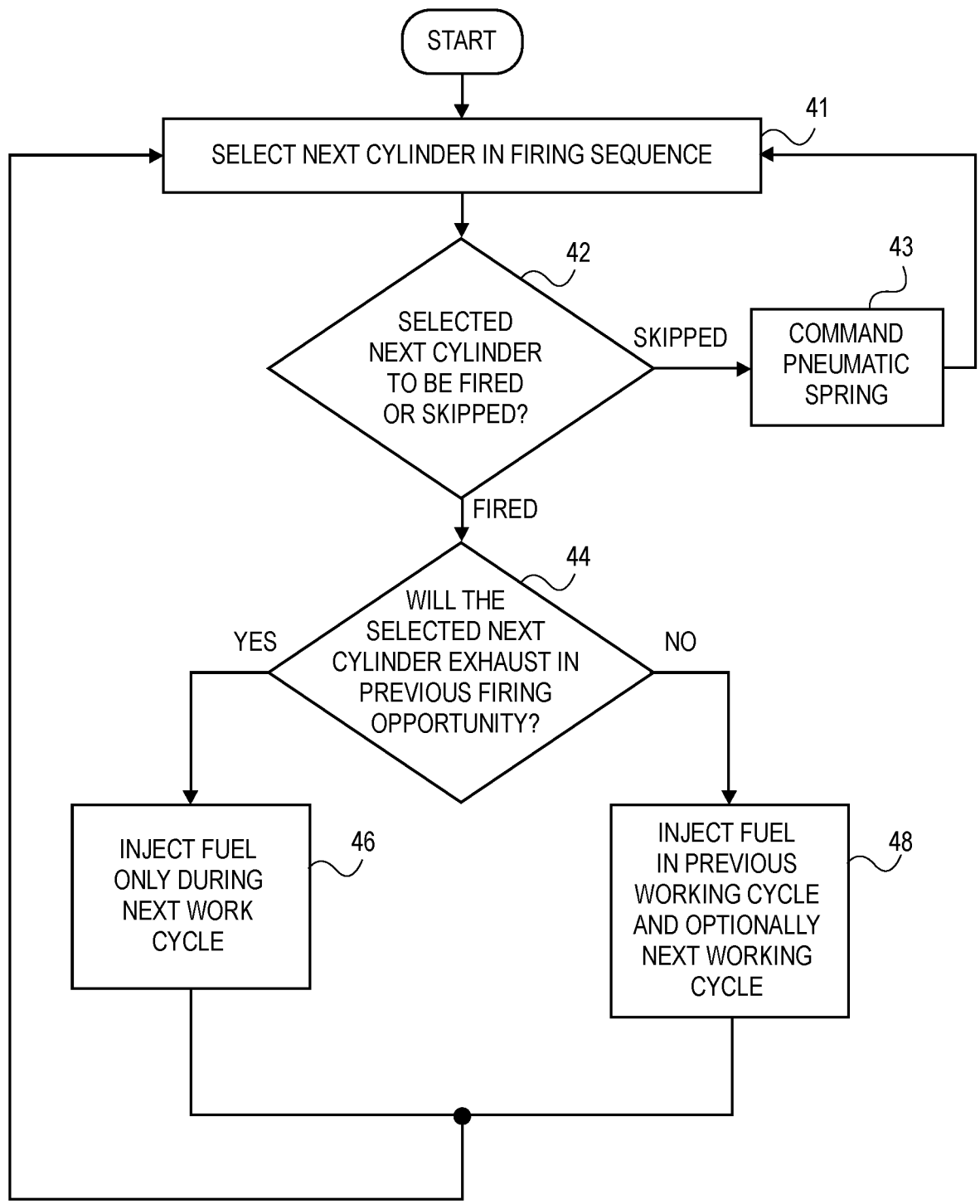
FIG. 4A illustrates a flow chart for implementing early direct fuel-injection in accordance with a non-exclusive embodiment of the invention.

Referring to FIG. 4A, a flow chart 40 for implementing early direct fuel-injection by the skip fire engine controller 12 engine during operation of the internal combustion engine 14 is described.

In an initial step 41, the next cylinder 18 in the firing sequence is selected by the controller 12. As already described herein, the intake and/or exhaust valves may need to be either selectively activated or deactivated if commanded to operate as one of the pneumatic spring types if skipped or activated as normal if fired. Therefore, the controller 12 preferably performs this step well enough in advance to accommodate the timing needed for both (a) early fueling as discussed herein and (b) to allow sufficient time for the relatively slow actuation timing of the commands provided to the intake and exhaust valves of the selected cylinder next in the sequence.

In decision 42, it is determined if the selected cylinder 18 is to be fired or skipped. As previously described, the fire or skip decision is typically dictated per the current operating firing fraction of the internal combustion engine 14 and the sequenced order of the selected cylinder 18 in the engine cycle If skipped, then one of the pneumatic spring types is commanded in step 43.

If fired, then in decision 44, it is determined if the cylinder is to be exhausted or not in the previous working cycle.

If exhausted, then in step 46, the skip fire engine controller 12, in cooperation with the fuel injection controller 12A, commands the direct-injection of fuel only in the next working cycle when the cylinder is fired.

If not exhausted, then in step 48, the skip fire engine controller 12, in cooperation with the fuel injection controller 12A, commands the direct-injection of fuel in the previous working cycle and optionally in the next working cycle as well when the cylinder is fired.

In a non-exclusive embodiment, the above steps 42 through 46 or 48 are repeatedly performed as the cylinders 18 of the internal combustion engine 14 sequences through each engine cycle. Each time a cylinder is reactivated following a skip, the skip fire engine controller 12 determines if the cylinder in question will be exhausted or not in its previous working cycle. If exhausted, then the fuel injection controller 12A commands the injection of fuel only during the next working cycle when the cylinder 18 is fired. If not exhausted, then fuel injection controller 12A commands the early injection of fuel in the previous or skipped working cycle, and optionally in the next or fired working cycle as well.

In yet another non-exclusive embodiment, the skip fire engine controller 12 is a dynamic skip fire engine controller. With dynamic skip fire control, each of the plurality of cylinders 18 of the internal combustion engine 14 are commanded to be either fired or skipped, on a working cycle-by-working cycle basis or on an engine cycle-by-engine cycle basis.

Figure 4B:
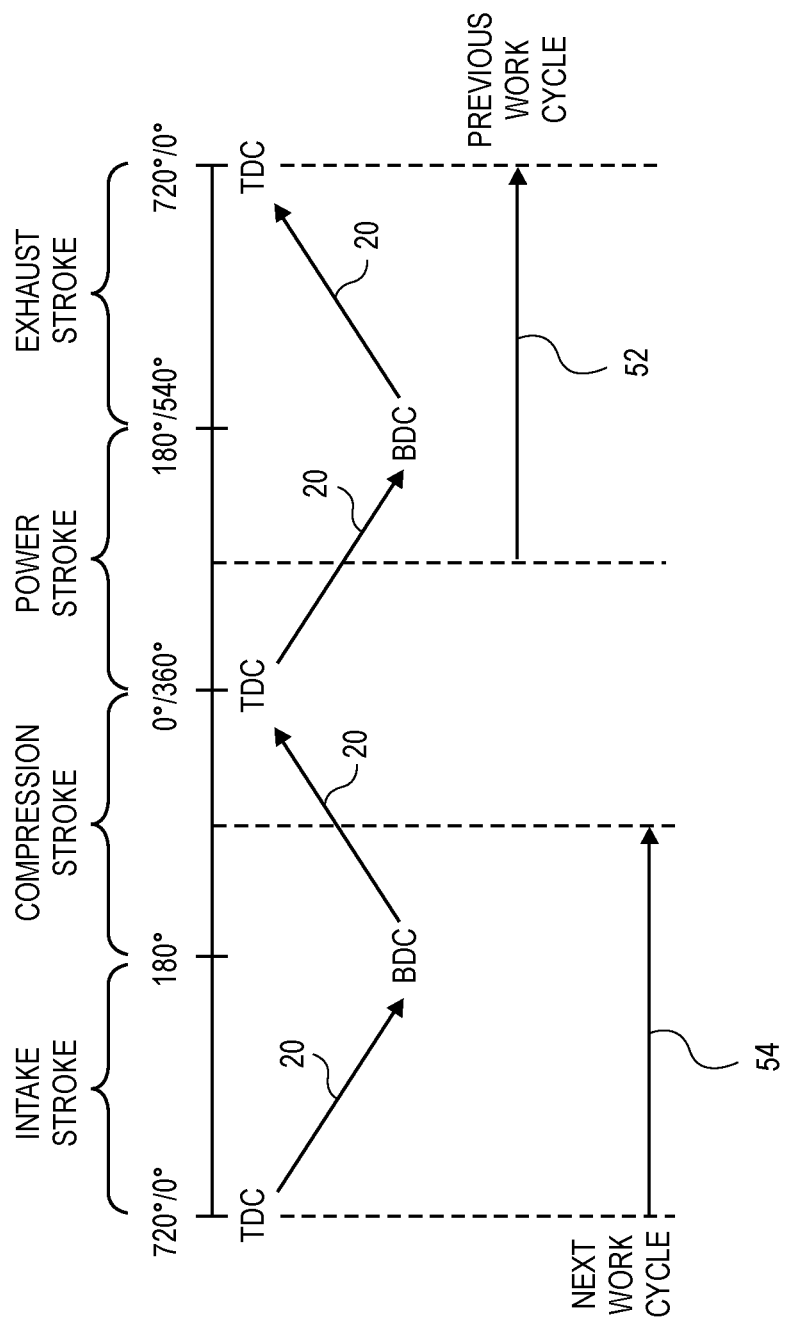
FIG. 4B illustrates a range for the direct-injection of fuel of a fired cylinder following a skip with respect to angular range of crankshaft rotation in accordance with a non-exclusive embodiment of the invention.

Referring to FIG. 4B, a diagram showing an angular range in which command(s) for the injection of fuel for a reactivated cylinder may occur with respect to crankshaft rotation during the previous working cycle and the next working cycle. In one particular example, but non-exclusive embodiment, as signified by the arrow 52, the angular range begins at 450° and extends to 720° of the previous working cycle. This angular range generally coincides with the piston of a skipped cylinder crossing the mid-point between Top Dead Center (TDC) and Bottom Dead Center (BDC) during the power stroke of the previous working cycle. Arrow 54 signifies the angular range for the direct-injection of fuel during the next working cycle when the cylinder is fired. In this case, the angular range extends from the start of the intake stroke when the cylinder is at TDC (0°) through the midpoint of the compression stroke (approximately 270°). It should be understood that these ranges are merely exemplary and should not be construed as limiting. The direct injection of one or more pulses of fuel may occur earlier than 450° and end before 720°.

Early Direct Fuel Injection Examples

FIGS. 5A-5F illustrate various examples of one or more early direct injected pulse(s) of fuel in accordance with various non-exclusive embodiments of the invention.

Figure 5A:
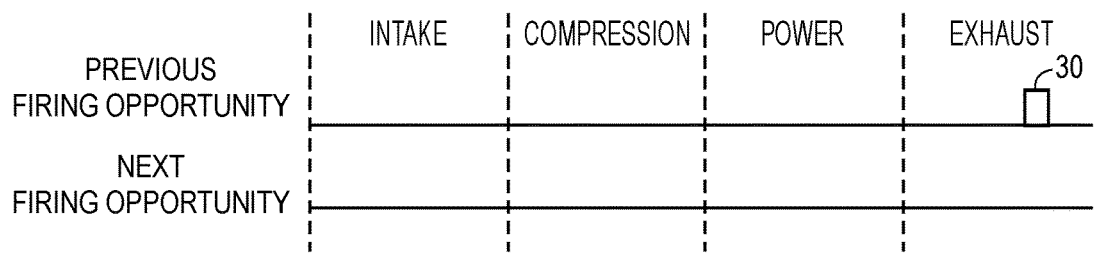
FIGS. 5A-5F illustrate various examples of one or more early direct injected pulse(s) of fuel in accordance with various non-exclusive embodiments of the invention.

In FIG. 5A, a single pulse of fuel 30 is direct-injected during the exhaust stroke of the previous cycle.

Figure 5B:
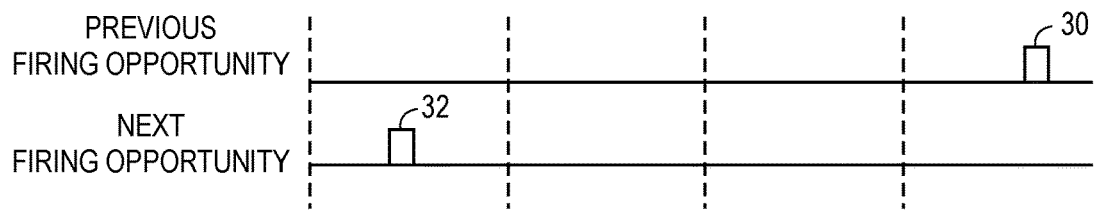

In FIG. 5B, a single pulse of fuel 30 is injected during the exhaust stroke of the previous cycle and a second pulse of fuel 32 is injected during the intake stroke of the next cycle.

Figure 5C:
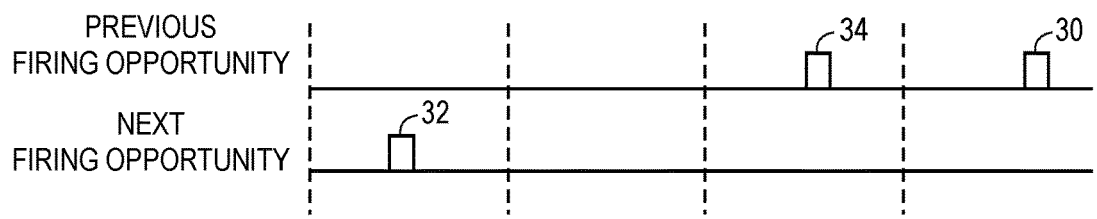

In FIG. 5C, a single pulse 34 of fuel is injected in the power stroke of the previous work cycle in addition to pulses 30 and 32 in the exhaust stroke of the previous working cycle and the intake stroke of the next working cycle respectively.

Figure 5D:
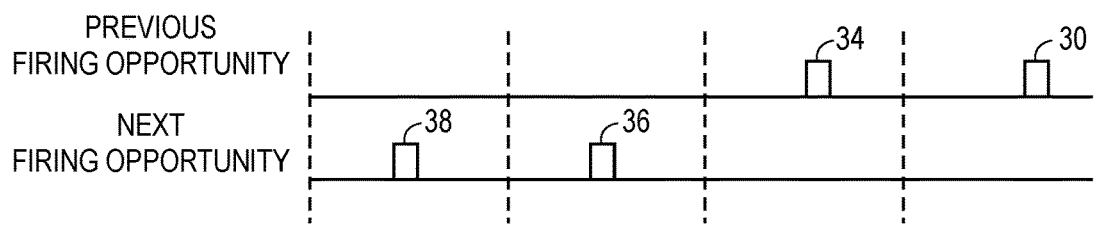

In FIG. 5D, four pulses 34, 30, 38 and 36 occur in the power and exhaust strokes of the previous working cycle and the intake and compression strokes of the next working cycle respectively.

Figure 5E:
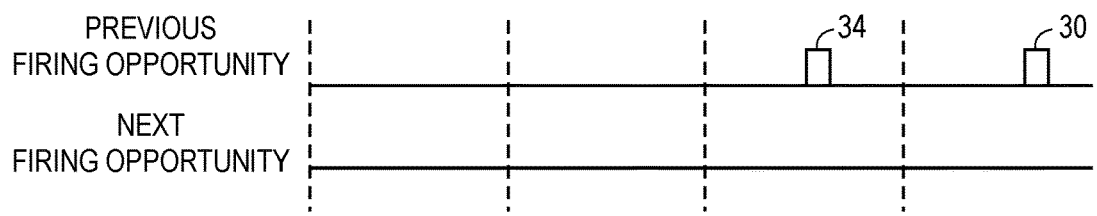

In FIG. 5E, pulses 34 and 30 are injected only in the power and exhaust strokes of the previous working cycle.

Figure 5F:
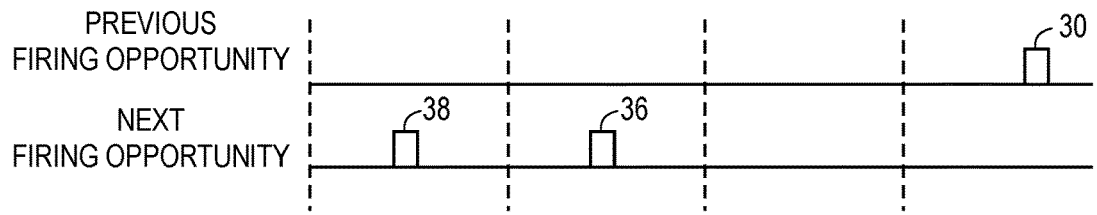

In FIG. 5F, a single pulse 30 is injected during the exhaust stroke of the previous working cycle and pulses 38 and 36 are injected during the intake and combustion strokes of the next working cycle respectively.

It should be understood that the above examples are merely exemplary and should not be construed as limiting in any regard. On the contrary, a wide range of different early fueling strategies may be used, involving any number of direct-injection pulses occurring in any one or combination of the power and/or exhaust strokes of the previous working cycle, either alone or in combination with additional direct injection(s) of one or more pulses in the intake and/or combustion strokes of the immediately next cycle in which the cylinder is fired.

Pulse Width and Fuel Injection Pressure

The fuel spray penetration length of a pulse directly-injected into a cylinder is critical in providing ideal air-fuel mixing and for limiting emissions. The fuel spray penetration length, for any pulse, can be optimized by controlling at least two parameters, including (1) the duration or width of a fuel pulse and (2) the pressure at which the fuel is injected into the cylinder.

The size and other characteristics of cylinders 18 may vary from one internal combustion engine to the next. An ideal fuel spray penetration length for one engine may be inadequate for another internal combustion engine. By adjusting the pulse width and pressure parameters, a desired spray penetration length can be achieved for a wide variety of engines. For example, with some engines, an optimized fuel spray penetration may be achieved using a longer pulse width injected at low pressure. With other engines, the optimized fuel spray penetration length may be achieved with a shorter pulse width at high pressure.

With split injection, the desired fuel spray penetration length for each pulse can thus be individually controlled by selecting the injection pulse width and optionally adjusting the fuel rail pressure. As such, the pulse width and fuel rail pressure for each of the embodiments of FIGS. 5A-5F can thus be controlled to achieve a desired spray penetration length as needed or desired.

Pulse Timing

Several factors may also influence the timing of the direct-injection pulses. One such factor is engine speed. As a general rule, the faster the engine-speed, the earlier the fuel pulse(s) the better. At high engine speeds, the amount of time for fuel injected in an intake and/or compression strokes during a fired working cycle is less than if the engine is operating at a lower engine speed. Thus, at higher engine speeds, early injection offers the advantage of providing the fuel with more time in which to vaporize compared injecting the fuel only after the start of the fired working cycle. As previously noted, with more time for the fuel to vaporize, combustion is cleaner and more fuel efficient. With skip fire controlled engines with a significant number of re-activation events, the overall efficiency of the engine is improved, while generating fewer contaminants and other pollutants.

The number of successive skips of a cylinder may also be a factor in determining the timing of early pulse(s). In general, the walls of a cylinder tend to cool with each skip. If a cylinder experiences a relatively large number of skips, its walls may cool to the point that condensation of the fuel on the sidewalls may occur. To prevent condensation, the early injection of the fuel may occur a bit later in the previous working cycle immediately before the firing of the cylinder.

It should be understood that the embodiments provided herein are merely exemplary and should not be construed as limiting in any regard. Although only a few embodiments have been described in detail, it should be appreciated that the present application may be implemented in many other forms without departing from the spirit or scope of the disclosure provided herein.

What is claimed is:

1. An engine controller arranged to control an internal combustion engine, the engine controller configured to:
   (a) command a cylinder to be fired in a working cycle;
   (b) ascertain if the cylinder is or will be skipped and not fired, operated as a Low Pressure Exhaust Spring (LPES), and is not exhausted during a previous working cycle that immediately precedes the working cycle; and
   (c) if skipped and not fired, operated as an LPES, and not exhausted, command a pulse of fuel be directly-injected into the cylinder during the previous working cycle for combustion during the working cycle.

2. The engine controller of claim 1, wherein the pulse of fuel is commanded to be direct-injected into the cylinder in either a power stroke or an exhaust stroke of the previous working cycle.

3. The engine controller of claim 1, further configured to command a second pulse of fuel to be direct-injected into the cylinder during the previous working cycle, the direct-injection of the two pulses occurring in one of the following:
   (d) both in a power stroke of the previous working cycle;
   (e) both in a exhaust stroke of the previous working cycle; or (f) in the power stroke and in the exhaust stroke of the previous working cycle respectively.

4. The engine controller of claim 1, further configured to command a direct-injection of one or more additional pulses of fuel into the cylinder during the working cycle, the direct-injection of the one or more additional pulses occurring:
   (d) in an intake stroke of the working cycle;
   (e) in a compression stroke of the working cycle; or
   (f) in both the intake stroke and the compression stroke of the working cycle.

5. The engine controller of claim 1, further configured to command direct-injection of one or more pulses of fuel only during the working cycle if the cylinder was exhausted in the previous working cycle.

6. The engine controller of claim 1, wherein the internal combustion engine includes a plurality of cylinders, the engine controller further arranged to:
   (d) command each of the plurality of cylinders to be either fired or skipped as the plurality of cylinders operate in a sequenced order over multiple engine cycles; and
   (e) repeat (a) through (c) for each of the plurality of cylinders as operated in the sequenced order over the multiple engine cycles.

7. The engine controller of claim 1, further configured to skip the cylinder during the previous working cycle by commanding:
   not fueling the cylinder for combustion in the previous working cycle; and
   exhaust valve(s) of the cylinder to remain closed at least during an exhaust stroke of the previous working cycle.

8. The engine controller of claim 1, wherein the internal combustion engine includes a plurality of cylinders and the engine controller is a dynamic skip fire engine controller that is arranged to command some cylinder firing opportunities to be fired while commanding other cylinder firing opportunities to be skipped on either:
   (d) a firing opportunity-by-firing opportunity basis; or
   (e) an engine cycle-by-engine cycle basis.

9. The engine controller of claim 1, further configured to command the direct-injection of the pulse of fuel during the previous working cycle to occur sometime between:
   (d) a mid-point of a power stroke of the previous working cycle; and
   (e) completion of the exhaust stroke of the previous working cycle.

10. The engine controller of claim 1, further configured to command the direct-injection of the pulse of fuel during the previous working cycle when a crankshaft associated with the internal combustion engine is within an angular range of approximately 450° to 720°.

11. The engine controller of claim 1, wherein timing of the pulse commanded to be directly-injected into the cylinder during the previous working cycle is at least partially dependent on engine speed.

12. A method for controlling an internal combustion engine by commanding a pulse of fuel to be direct-injected into a cylinder during a previous working cycle in which the cylinder is skipped and is not fired, operated as a Low Pressure Exhaust Spring (LPES), and the cylinder is not exhausted, the direct-injected fuel used for combustion and firing of the cylinder in a next working cycle that immediately follows the previous working cycle.

13. The method of claim 12, further comprising commanding the direct-injection of the pulse of fuel during either a power stroke or an exhaust stroke of the previous working cycle.

14. The method of claim 13, further comprising commanding direct-injection of one or more additional pulses of fuel during the previous working cycle, the one or more additional pulses of fuel directly injected in one of the following:
   (a) the power stroke;
   (b) the exhaust stroke; or
   (c) both the power stroke and the exhaust stroke.

15. The method of claim 12, further comprising commanding direct-injection of one or more additional pulses of fuel during the next working cycle, the one or more additional pulses of fuel commanded to be directly-injected in one of the following:
   (a) an intake stroke of the next working cycle;
   (b) a compression stroke of the next working cycle; or
   (c) the intake and the compression strokes of the next working cycle.

16. The method of claim 12, further comprising operating the internal combustion engine by selectively firing some cylinder firing opportunities while selectively skipping other cylinder firing opportunities.

17. The method of claim 16, further comprising dynamically making decisions to command firing or skipping the cylinders on a firing opportunity-by-firing opportunity basis or an engine cycle-by-engine cycle basis.

18. The method of claim 12, further comprising commanding the direct-injection of the pulse of fuel during the previous working cycle any time after a reciprocating piston associated with the cylinder crosses a mid-point between a Top Dead Center (TDC) position and a Bottom Dead Center (BDC) position during a power stroke of the previous working cycle.

19. The method of claim 12, further configured to command the direct-injection of the pulse of fuel during the previous working cycle within an angular range 450° to 720° of crankshaft rotation with respect to the previous working cycle.

20. The engine controller of claim 1 further configured to direct skip fire operation of the engine in which some working cycles are commanded to be fired and other working cycles are commanded to be skipped and not fired, whereby the engine controller is a skip fire engine controller and (b) and (c) occur during skip fire operation of the engine.

21. The system of claim 20, wherein the skip fire engine controller is further configured to command the early injection of the fuel into the select cylinder using one of the following:
   (d) one or more pulses of fuel in an exhaust stroke of the immediately preceding skipped and not exhausted working cycle;
   (e) one or more pulses of fuel in a combustion stroke of the immediately preceding skipped and not exhausted working cycle; or
   (f) multiple pulses of fuel in both the exhaust stroke and the combustion stroke of the immediately preceding skipped and not exhausted working cycle.

22. The system of claim 20, wherein the skip fire engine controller is further configured to command the early injection of the fuel into the select cylinder during the immediately preceding skipped and not exhausted working cycle within an angular range 450° to 720° of crankshaft rotation with respect to the immediately preceding skipped and not exhausted working cycle.

23. The engine controller of claim 1, wherein the direct-injection of the pulse of fuel during the previous working cycle resulting in the pulse of fuel vaporizing and mixing with air within the cylinder during an induction stroke of the working cycle to a more significant degree relative to a subsequent direct-injection during only the working cycle.

24. The method of claim 12, wherein the direct-injection of the pulse of fuel during the previous working cycle resulting in the pulse of fuel vaporizing and mixing with air within the cylinder during an induction stroke of the next working cycle to a more significant degree relative to a subsequent direct-injection during only the next working cycle.

* * * * *